(12) United States Patent
Thuma et al.

(10) Patent No.: US 10,351,155 B1
(45) Date of Patent: Jul. 16, 2019

(54) LAUNDRY CART

(71) Applicant: Suncast Technologies, LLC, Jupiter, FL (US)

(72) Inventors: Michael Thuma, La Grange, IL (US); Torrence Anderson, Overland Park, KS (US); Dov Blitzer, Naperville, IL (US); William J. Phillips, Batavia, IL (US); Michael Uffner, Naperville, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/970,210

(22) Filed: May 3, 2018

(51) Int. Cl.
| | | |
|---|---|---|
| B62B 5/02 | (2006.01) | |
| B62B 5/00 | (2006.01) | |
| B62B 3/02 | (2006.01) | |
| D06F 95/00 | (2006.01) | |
| B62B 5/06 | (2006.01) | |
| B60B 33/00 | (2006.01) | |

(52) U.S. Cl.
CPC .............. B62B 5/0006 (2013.01); B62B 3/02 (2013.01); D06F 95/002 (2013.01); B60B 33/0002 (2013.01); B62B 5/06 (2013.01); B62B 2202/66 (2013.01); B62B 2301/04 (2013.01)

(58) Field of Classification Search
CPC ... B62B 2202/66; B62B 2202/22; B62B 3/02; B62B 3/002; B62B 3/106
See application file for complete search history.

(56) References Cited

U.S. PATENT DOCUMENTS

| | | | |
|---|---|---|---|
| 1,582,272 | A | 4/1926 | Josephson |
| 3,031,092 | A | 4/1962 | Maskel |
| 3,106,409 | A | 10/1963 | Berlin |
| 3,168,271 | A | 2/1965 | Deschenes |
| 3,215,182 | A | 11/1965 | Silverman |
| 3,310,089 | A | 3/1967 | Silverman |
| 3,498,689 | A | 3/1970 | Hansen |
| 3,633,932 | A | 1/1972 | Holden |
| 3,722,905 | A | 3/1973 | Solomon |
| 4,244,410 | A | 1/1981 | Silverman |
| 4,300,611 | A | 11/1981 | Silverman |
| 4,915,329 | A | 4/1990 | Doninger |
| 5,040,811 | A | 8/1991 | Busken et al. |
| 5,154,359 | A | 10/1992 | Junta et al. |

(Continued)

*Primary Examiner* — Bryan A Evans
(74) *Attorney, Agent, or Firm* — McHale & Salvin, P.A.

(57) ABSTRACT

A laundry cart comprised of a base assembly, casters, steel frame assembly, handle, and fabric hamper body. The quadrilateral base includes a pair of longitudinally spaced U-shaped members interposed between a pair of longitudinal slats and a plurality of transverse slats fixed together in a common lattice fashion. The steel frame assembly is comprised of uprights along the periphery of the base platform, which includes offset uprights and corner uprights. The corner uprights are attached above the base, thereby reducing the shear stress on the laundry cart. The Z-shaped offset uprights allow all the uprights on the short side and long side of the cart to be on the same plane. The hamper body is sized and configured to seat within the uprights and crossmembers. The hamper body includes reinforced trim along the top periphery, which is constructed of a sewn soft rubber to prevent scuffing and damage to walls and doors.

14 Claims, 8 Drawing Sheets

(56) References Cited

U.S. PATENT DOCUMENTS

| | | | |
|---|---|---|---|
| 5,611,554 A | 3/1997 | Eckloff | |
| 7,243,929 B2 | 7/2007 | Suchecki | |
| 7,802,526 B2 * | 9/2010 | Brady | B65D 19/12 108/53.5 |
| 8,100,280 B1 * | 1/2012 | Hernandez | D06F 95/002 206/278 |
| 8,528,919 B2 * | 9/2013 | Webster | B62B 3/008 280/651 |
| 2002/0046981 A1 | 4/2002 | Amish | |
| 2003/0168461 A1 | 9/2003 | Richardson | |
| 2006/0157358 A1 | 7/2006 | Heidel | |
| 2007/0278768 A1 | 12/2007 | Lynam | |
| 2008/0105686 A1 | 5/2008 | Cox | |
| 2008/0277906 A1 | 11/2008 | Dunne et al. | |
| 2011/0304113 A1 | 12/2011 | Clover | |
| 2013/0206774 A1 | 8/2013 | Menschel et al. | |

* cited by examiner

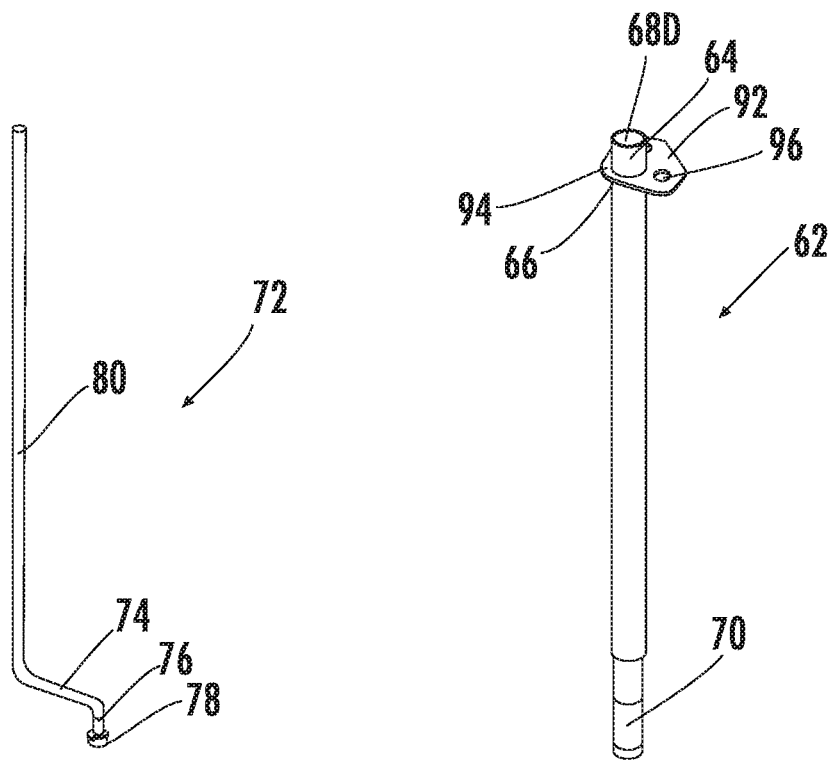
FIG. 8
FIG. 9
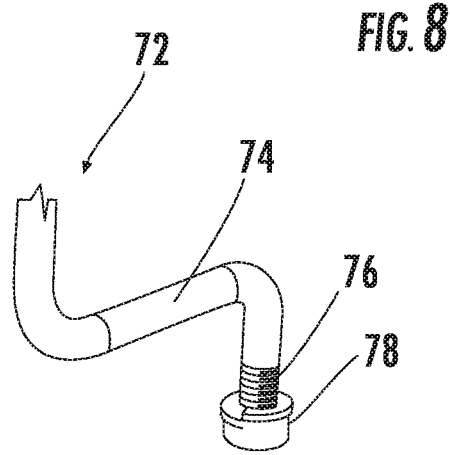
FIG. 10

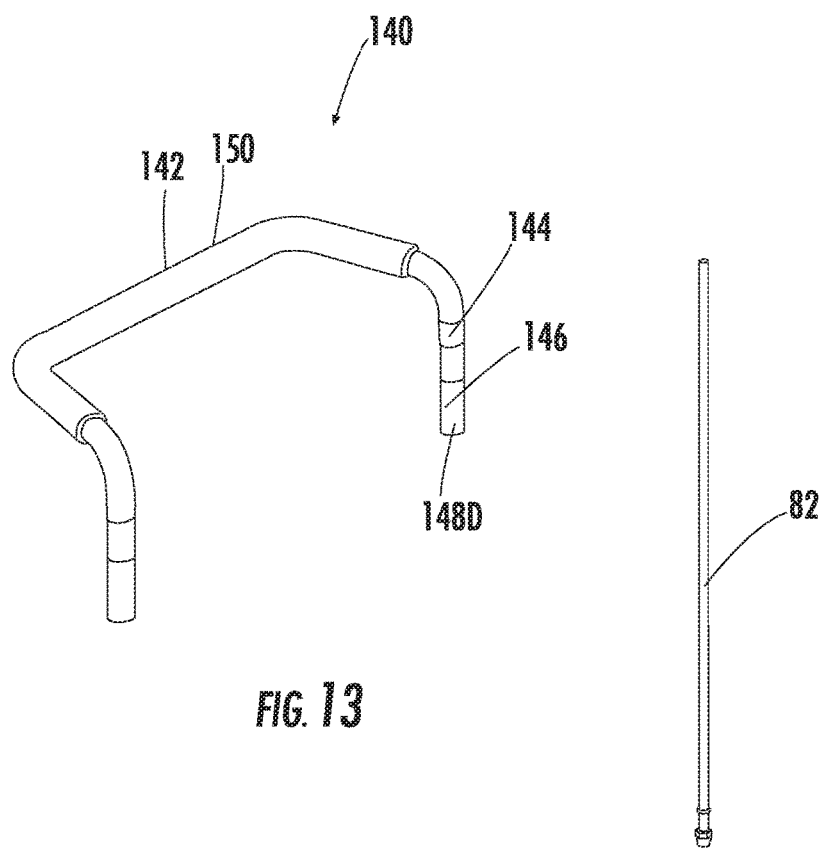
FIG. 13
FIG. 11
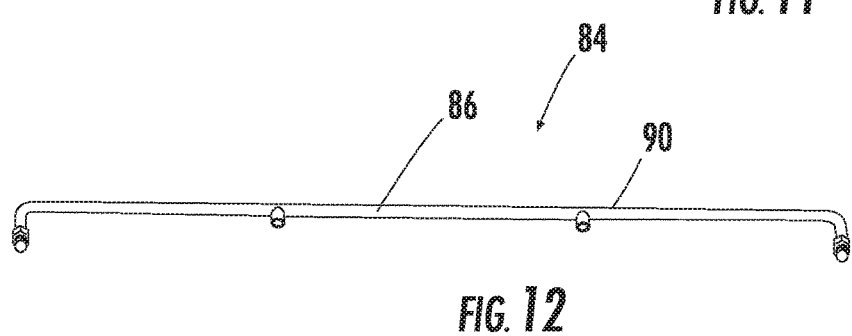
FIG. 12

LAUNDRY CART

FIELD OF THE INVENTION

The present invention relates generally to utility carts, and more particularly, to a laundry cart having a base that allows for less shearing on the corner uprights, rubber bumpers on corner uprights, and a soft sewn rubber on the trim of the hamper body to prevent scuffing, marring, and damage to walls and doors.

BACKGROUND OF THE INVENTION

It is conventional in institutions, such as hospitals and hotels, to transport soiled laundry to laundry facilities, remove it from the laundry cart, and launder it. The transportation of such soiled laundry is accomplished using various laundry cart devices. Unfortunately, as the laundry cart passes through doorways and confined hallways, the inevitable size of the laundry cart usually leads to bumping, scratching, marring, and damage to the walls and doorways of the institution. When carts hit walls, doors, and equipment, they can cause severe damage and incur more expenses for the institution annually. Most transportation carts are built to last, but not built to protect the walls and décor of the institution. There is a need in the art for a laundry cart having bumpers or resilient corners that can help prevent damage to the walls and doorways in institutions.

Known carts for laundry include a body having walls defining an interior with an opening defined at a top of the body for placing laundry into or removing laundry from the cart interior. It is known that the body may be comprised of multiple configurations, such as, but not limited to, a unitary blow-molded piece, a removable tub, or a removable hamper bag. In the case of a removable hamper bag, the base is typically comprised of a wooden pallet base with wire framing extending upwardly from the pallet base to seat the hamper bag. Although these carts served their intended purpose, there is a need in the art for a more durable laundry cart. For instance, the wooden pallet base tends to weaken with constant pounding due to overuse and excessive loading and unloading. The metal wire framing also weakens at the joints. Typically, there are two types of attachment means of the metal framing to the base, either welding or removable attachments, such as screws or the like. Both attachments occur at the base; however, due to the L-shaped design of the post making up the metal wire frame, the posts lose strength over time due to loosening at their joints, which is caused by a shearing effect at the bend.

Thus, there is a need in the art for a laundry cart that is easy to assemble. The assembly of the cart should not require special tools nor should it require excessive strength. The assembled cart should be robust in construction, and should minimize damage to a building structure from rubbing against walls and movement during ordinary use.

SUMMARY OF THE INVENTION

A laundry cart comprised of a base, casters, steel frame assembly, handle, and fabric body is disclosed. The quadrilateral base includes a pair of longitudinally spaced U-shaped members interposed between a pair of longitudinal slats and a plurality of transverse slats fixed together in a lattice fashion. The U-shaped members are constructed and arranged to rotate between a flat shipping position and an upright use position. The steel frame assembly is comprised of uprights along the periphery of the base that include offset uprights and corner uprights. The corner uprights are attached above the base, thereby reducing the shear stress on the laundry cart. Z-shaped offset uprights allow all the uprights on the short side and long side of the cart to be on the same plane. The hamper body is sized and configured to seat within the uprights and crossmembers. The hamper body includes reinforced trim along the top periphery that is constructed of a sewn soft rubber, which prevents scuffing and damage to walls and doors when accidentally bumped.

Accordingly, it is an objective of the present invention to provide a laundry cart that minimizes wear, tear, marking, scuffing, and marring of walls and doors when used.

Another objective of the present invention is to provide a laundry cart that is lightweight and easy to maneuver.

Yet another objective of the present invention is to provide a laundry cart that is easy to assemble and disassemble.

Still another objective of the present invention is to provide a laundry cart including U-shaped members on the base to provide strength and integrity to the framework assembly.

Still yet another objective of the present invention is to provide a laundry cart having U-shaped members that are constructed to rotate between a flat shipping position and an upright use position to conserve shipping space.

A further objective of the present invention is to provide a laundry cart with offset uprights having a Z-shape on the bottom portion thereof and attached to the base so that all the uprights along the periphery of the base are along the same plane.

A still further objective of the present invention is to provide a laundry cart with corner plates constructed of a soft polymeric material that act as a bumper to prevent scuffing and damage to walls.

Still yet a further objective of the present invention is to provide a laundry cart having metal corner plates and having a rubber bumper fitted over the metal corner plates to prevent scuffing and damage when the cart accidentally hits walls and doors.

Still another objective of the present invention is to provide a laundry cart having a hamper body with a reinforced trim along the top periphery for insertion of crossmembers; the trim being constructed of a rubber which reduces scuffing and damage to walls and doors during use.

Still yet another objective of the present invention is to provide a laundry cart having a hamper body with a reinforced elastic trim to allow the hamper body and crossmembers to flex downwardly to allow objects to be grasped from the bottom of the hamper and return to their original positions.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 8 is a side view of the corner upright of the instant invention;

FIG. 9 is a side perspective view of the offset, or Z-shaped, upright of the instant invention;

FIG. 10 is a perspective view of the bottom portion of the offset upright of the instant invention;

FIG. 11 is a side view of an additional upright of the instant invention;

FIG. 12 is a bottom perspective view of the U-shaped crossmember of the instant invention;

FIG. 13 is a side perspective view of the handle of the instant invention; and

DETAILED DESCRIPTION OF THE INVENTION

Figure 1:
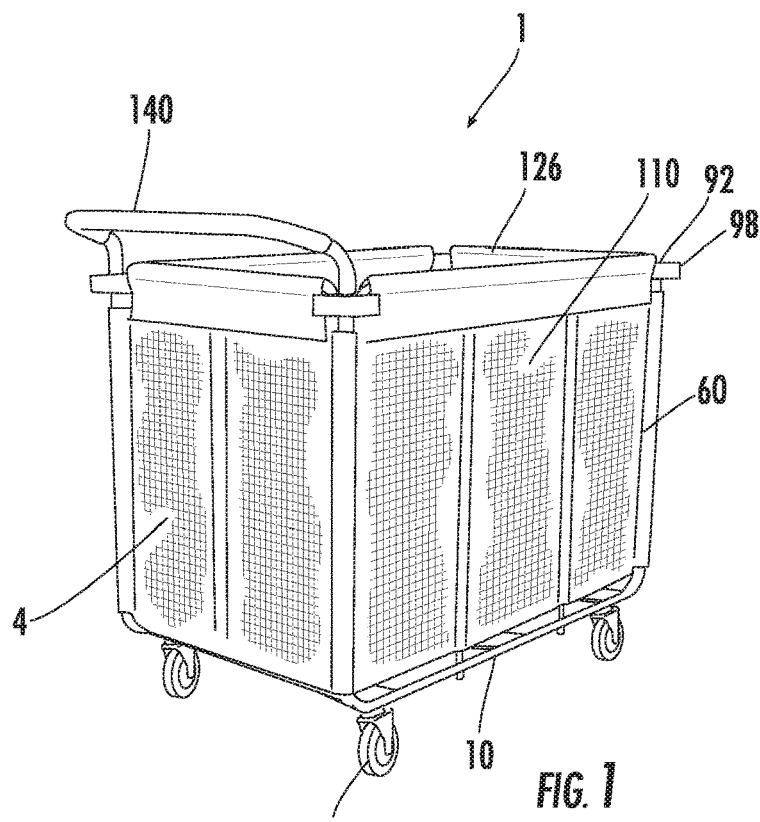
FIG. 1 is back side perspective view of the laundry cart.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
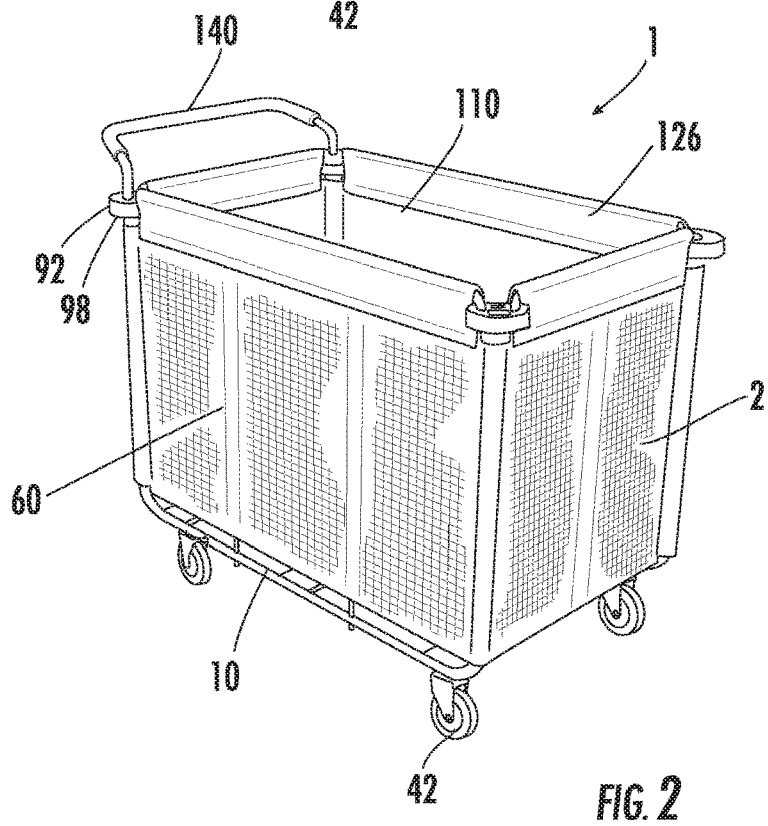
FIG. 2 is a front side perspective view of the laundry cart.
Figure 3:
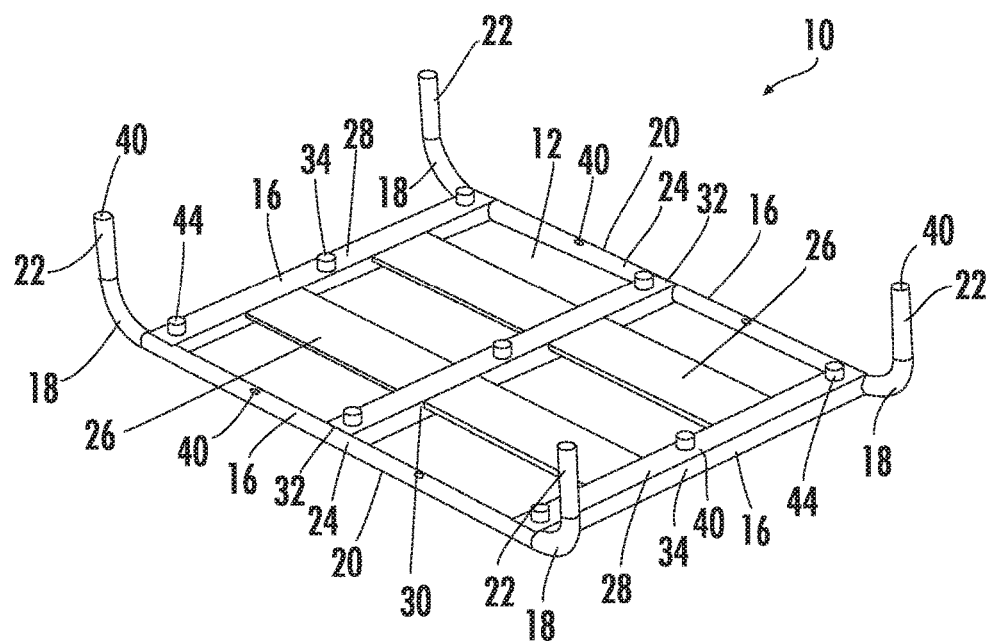
FIG. 3 is a top perspective view of the base of the instant invention.
Figure 4:
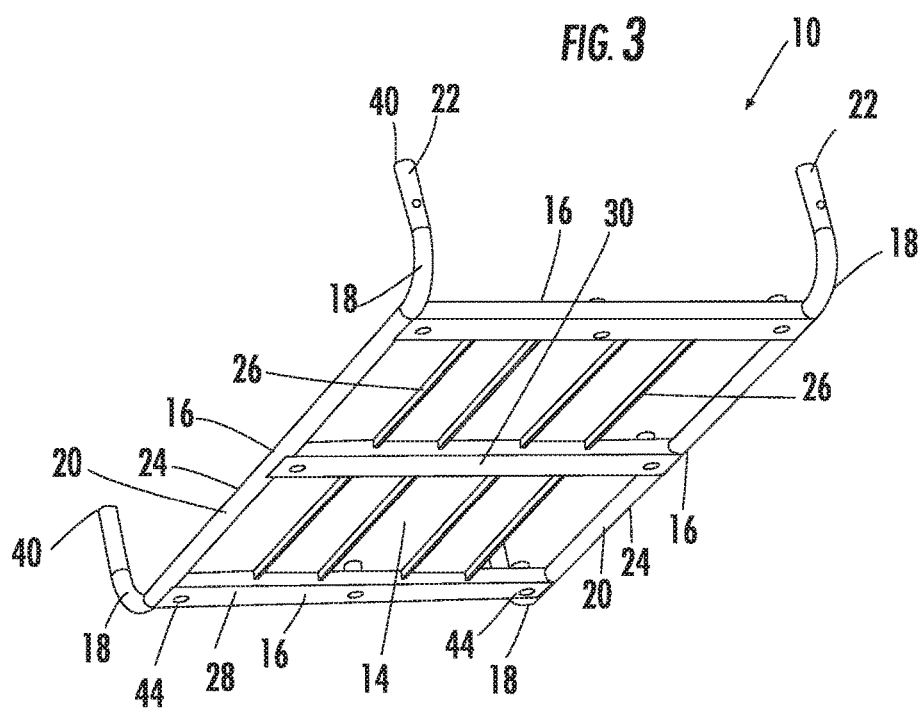
FIG. 4 is a bottom perspective view of the base of the instant invention.
Figure 14:
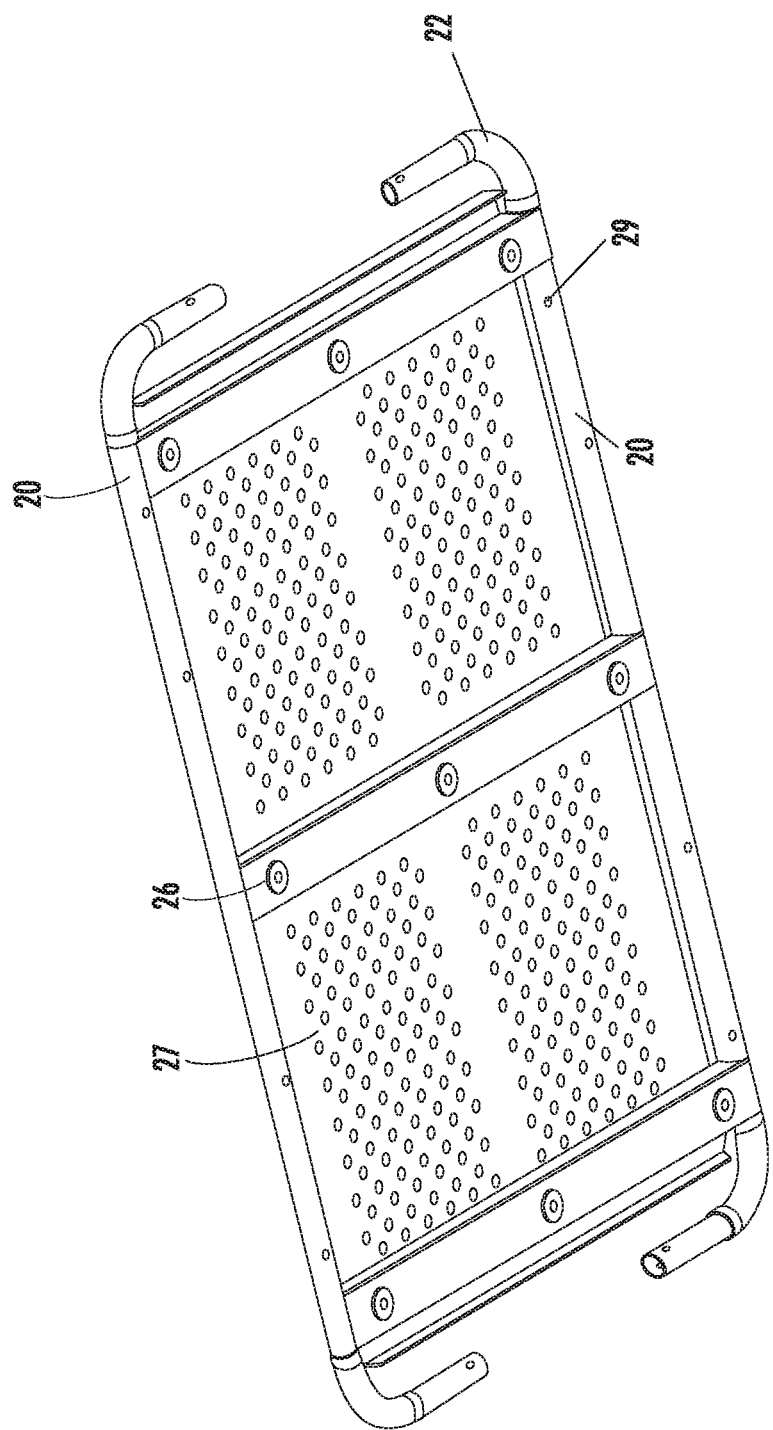
FIG. 14 is a bottom side perspective view illustrating the rotating U-shaped members in a shipping position to conserve shipping space.

Referring now to FIGS. 1-14, the present invention relates to a laundry cart 1 comprised of a base assembly 10, frame assembly 60, casters 42, handle 140 and fabric body 110. The laundry cart 1 has a front side 2 and back side 4. As shown in FIGS. 2 and 3, the base 10 has a quadrilateral shape comprised of a pair of longitudinally spaced U-shaped members 20. Interposed between the U-shaped members 20 is a pair of longitudinal slats 26 and a plurality of transverse slats 28 fixed together in a common lattice fashion. The U-shaped members 20 provide strength and integrity to the frame assembly 60 because the corner uprights 62 are not attached directly to the base platform 10 (such as seen in prior art); rather, the corner uprights 62 are attached at a position above the base 10, as shown in FIG. 6, thereby reducing the shear stress typically seen in prior art wire frame laundry carts. As shown in FIG. 3, the top side 12 of the base 10 includes apertures 40 along the midpoint 34 of each transverse slat 28. The center transverse slat 30 does not include apertures 40 thereon. The vertical ends 22 of each U-shaped leg 20 also include apertures 40, as well as apertures 40 spaced along the horizontal portion 24 of the U-shaped members 20. The pair of longitudinal slats 26 provides structural support and integrity to the laundry cart 1. The base 10 further includes a caster 42, at least at each corner 18 thereof, mounted on the underside 14 of the base assembly 10, as shown in FIGS. 1 and 2. As shown in FIGS. 3 and 4, the base 10 includes extended holes 44 for mounting of the casters 42 at each corner 18. Also provided are extended holes 44 on the midpoint 24 of each traverse slat 28, excluding the center traverse slat 30, as well as extended holes 44 at the endpoints 32 of the center traverse slat 30. These additional extended holes 44 are provided with contemplation of adding extra caster wheels 42 onto the laundry cart for purposes such as stability or ease in handling, not shown. In at least one embodiment, the vertical ends 22 of the U-shaped members are allowed to fold flat, as shown in FIG. 14 to reduce the requirement of space needed for shipping purposes. A spring loaded button 29 is provided for each vertical end, which allows each vertical end 22 to be oriented and locked in an upright position. In at least one embodiment, the longitudinal slats 26 may be replaced with a sheet of perforated metal 27 which provides structural integrity to the laundry cart and provides a substantially solid floor for supporting any load placed into the cart.

Figure 5:
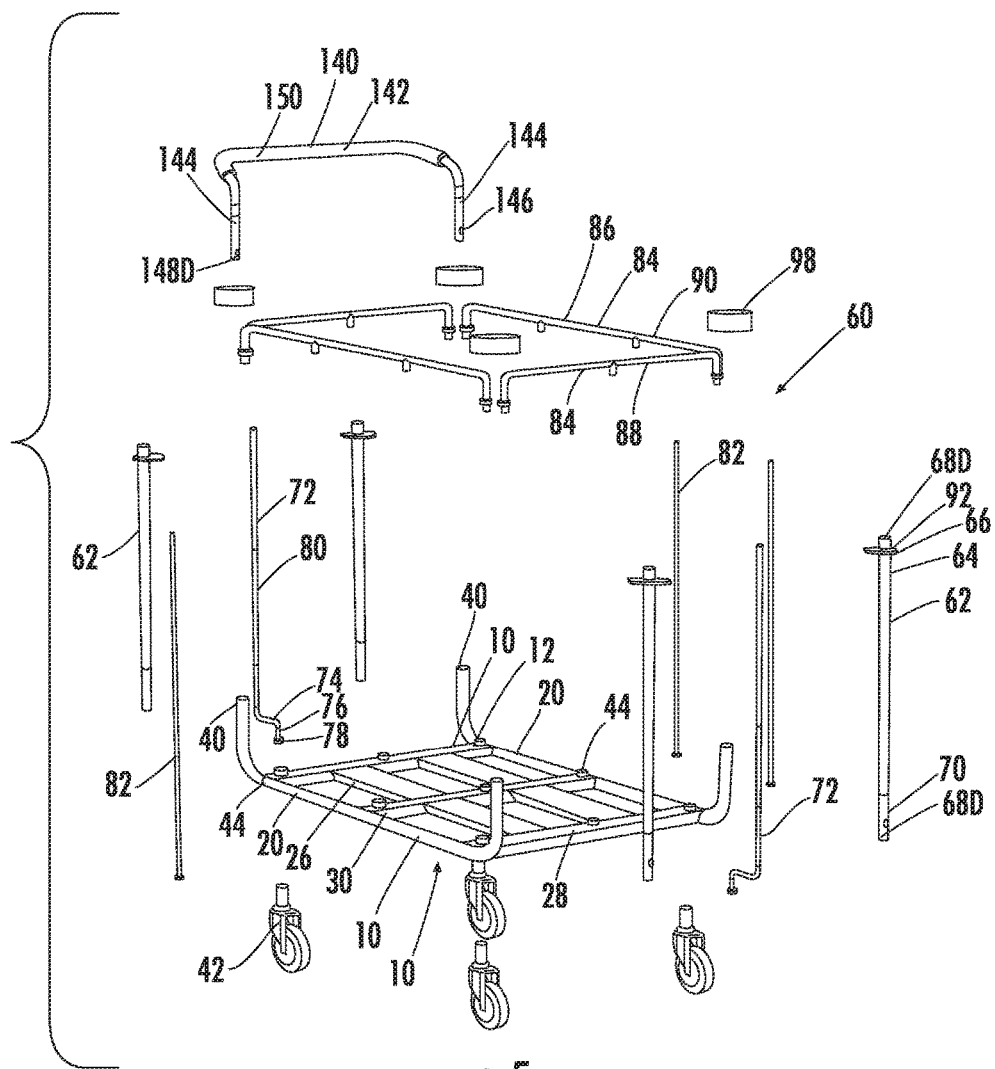
FIG. 5 is an exploded view of the laundry cart without the hamper body of the instant invention.
Figure 6:
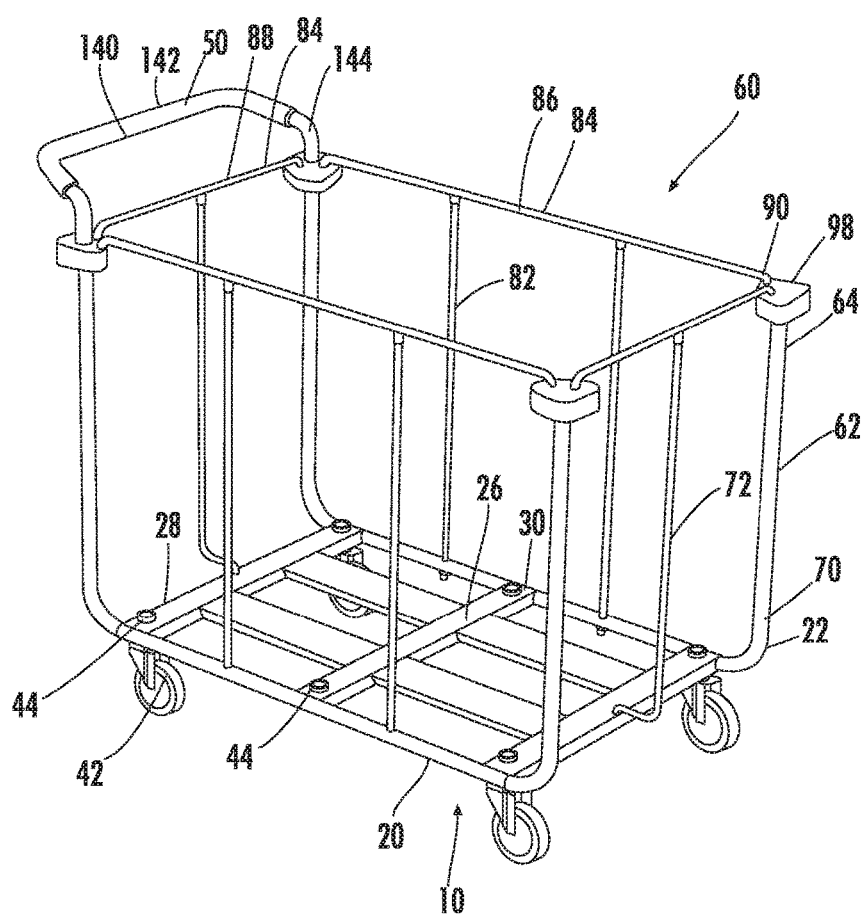
FIG. 6 is an assembled view of the laundry cart without the hamper body of the instant invention.

A frame assembly 60 is attached on the top side 12 of the base 10, as shown in FIGS. 5 and 6. The frame assembly 60 is comprised of a plurality of uprights arranged and constructed to attach to the apertures 40 along the periphery 16 of the base 10. The four corner uprights 62 connect to apertures 40 on the vertical portion 22 of the U-shaped members 20, and are preferably of a larger diameter 68D, more aptly shown in FIGS. 5 and 8, than the central uprights 82 and offset uprights 72. The attachment means of the corner uprights 62 to the apertures 40 is contemplated as a telescoping cooperation between the corner uprights 62 and the U-shaped members 20, with one portion of the telescoping members including a spring pin 70 (shown in FIG. 8). It should be noted that, while the spring pin 70 arrangement is preferred, other suitable attachment means are contemplated, such as, but not limited to, a compression fitting, latch assembly, cotter pin, nut and bolt, screw, rivet or the like. The two uprights connected to the center apertures 40 on the transverse slats 28 are offset uprights 72. The attachment means for these offset uprights 72 include a threaded bottom portion 76, whereby the bottom portion 74 is inserted through the aperture 40 on the transverse slat 28 and a nut 78 is threaded onto the offset upright 72 on the underside 14 of the base 10, more aptly shown in FIGS. 9 and 10. The offset uprights 72 have a Z-shape with an elongated vertical portion 80. The offset Z-shape on the bottom portion 74 of the offset uprights is provided so that all the uprights along the periphery 16 of the base platform 10 are along the same plane. If the offset was not provided, the uprights on the transverse slat 28 would sit on a different plane than the corner uprights 62. The central uprights 82 located on the mid-section of the U-shaped members 20 are vertical uprights that attach to the apertures 40 using a threaded bottom portion with a nut, similar to the offset uprights (shown in FIG. 11); however, other attachment means are contemplated, such as a weldment.

As shown in FIGS. 5, 6 and 12, the frame assembly 60 further includes four inverted U-shaped top crossmembers 84, one pair of top crossmembers being shorter than the other pair. The longer pair 86 of top crossmembers 84 engages the uprights along the U-shaped leg 20, the corner uprights 62 and the central uprights 82 along the length of the cart. The shorter pair 88 of top crossmembers 84 engages the corner uprights 62 and offset uprights 72 across the width of the cart. The crossmembers 84 are constructed of a rigid metal material that provides support for the hamper body 110.

As shown in FIGS. 1, 2, 5, 6 and 8, corner plates 92 are provided at the top portion 64 of the corner uprights 62. More aptly shown in FIG. 8, the corner plates 92 include three or more openings. One opening 94 is sized to allow the passage of the larger diameter corner uprights 62, and the other openings 96 are sized for the passage of the ends of the inverted U-shaped top crossmembers 84. In order to prevent the corner plate 92 from sliding down the corner uprights 62 when installed, an indention 66, fastener or the like may be provided along the top portion 64 of each corner upright 62 so that the corner plate 92 will remain in place atop the indention 66. The horizontal portion 90 of the inverted U-shaped top crossmembers 84 rests on the top surface of the corner plate 92, more aptly shown in FIGS. 5 and 6. The corner plate 92 is contemplated as being constructed of rubber and/or plastic that acts as a bumper to prevent scuffing and damage to walls when the cart accidentally hits walls and doors, not shown. It is also contemplated that the corner plates 92 are constructed of metal and have a rubber bumper 98 over-molded or fitted over the top to serve the purpose of preventing scuffing and damage to walls and doors.

Figure 7:
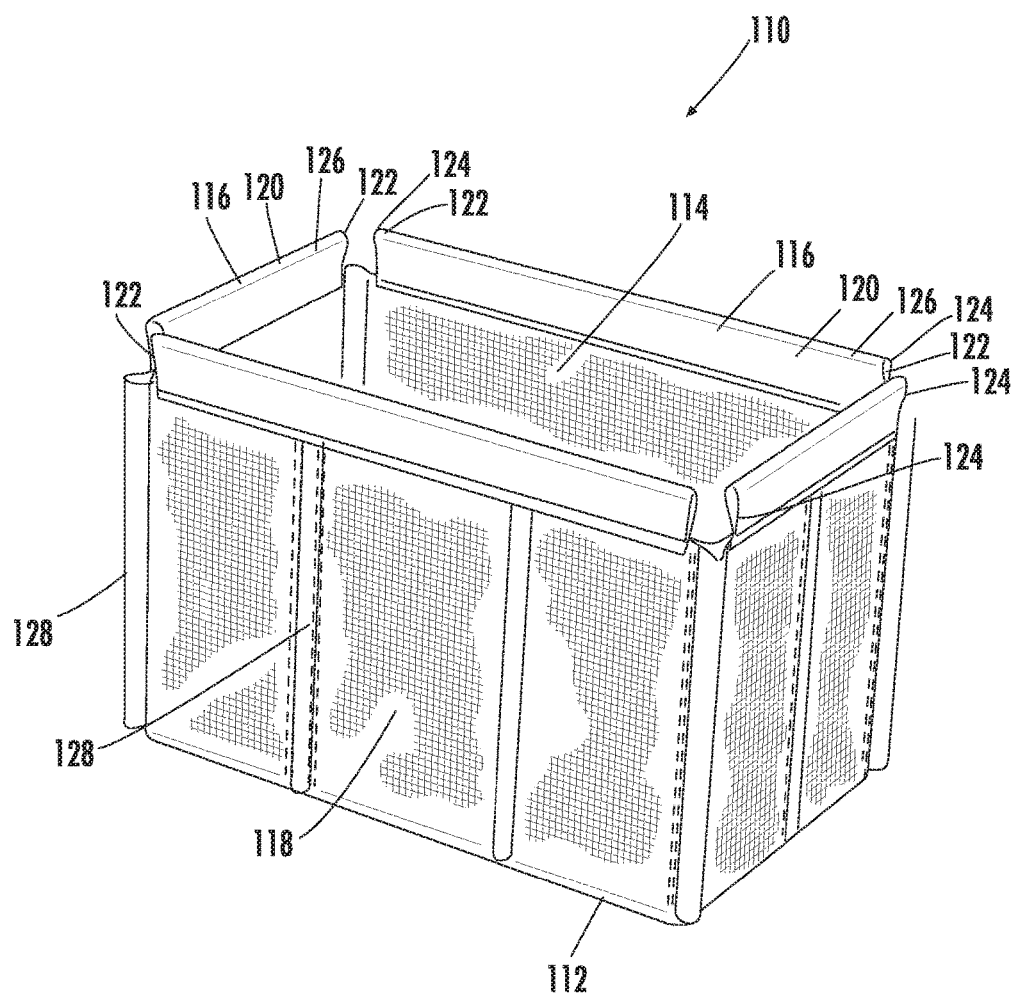
FIG. 7 is a perspective view of the hamper body of the instant invention.

As shown in FIGS. 1, 2 and 7, a hamper body 110 is sized and configured to sit within the frame assembly 60 with the bottom surface 112 of the hamper body 110 resting on the top side 12 of the base 10. The hamper body 110 includes a reinforced trim 120 along the periphery 116 of the top opening 114. The reinforced trim 120 includes openings 122 at each corner 124 to allow the shorter pair and longer pair of top crossmembers, 88 and 86, to pass therethrough so that the hamper body 110 sits within the frame assembly 60, shown in FIGS. 1 and 2. It is contemplated that the reinforced trim 120 is constructed of a sewn or overmolded soft rubber 126 which prevents scuffing and damage to walls and doors when accidentally bumped into. For further reinforcement, the hamper body 110 also includes seams 128 along the outer surface 118 that run vertically along the side of the hamper body and are positioned to cooperation with the remaining uprights, i.e. the offset uprights 72 and the central uprights 82. The seams 128 are sized to receive the length of the offset uprights 72 and central uprights 82 to provide greater strength and support to the hamper body 110.

As shown in FIGS. 5, 6 and 13, the back side 4 of the cart 1 is provided with a handle 140. The handle 140 includes a bar 142 and a pair of depending rods 144 with an attachment means, such as spring pins 146. The handle 140 is connectable to the top portion 64 of the corner uprights 62 on the back side 4 of the cart 1 using spring pins 146. The diameter 148D of the depending rods 144 would likely be smaller than the diameter 68D of the corner uprights 62. The bar 142 is further provided with a foam rubber sleeve 150 for accommodating the user.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A laundry cart having a compact shipping configuration comprising:
    a base assembly having a quadrilateral shape, a U-shaped member extending along each of the longer sides of the quadrilateral shape, a portion of said U-shaped member being rotatable between a shipping position, whereby an upright portion of said U-shaped member extends in the same plane as said base assembly, and a use position, whereby said U-shaped member extends upright with respect to said plane of said base assembly;
    a plurality of caster wheels secured to a bottom surface of said base assembly;
    a frame assembly including a plurality of corner uprights constructed and arranged to attach to said U-shaped members of said base assembly, so that at least one corner upright is positioned at each corner of said laundry cart;
    a corner plate secured at a top portion of each said corner upright;
    a plurality of crossmembers extending horizontally between said corner plates to construct an open centered quadrilateral, said crossmembers being U-shaped, said corner plates including apertures wherein the arms of said U-shaped crossmembers pass through to extend from one corner plate to another; and
    a hamper body sized and configured to sit within said frame assembly having a bottom surface of said hamper body resting on a top side of said base assembly, a reinforced trim extending around a top periphery opening of said hamper body, said reinforced trim constructed and arranged to allow said crossmembers to pass therethrough to support said top periphery of said hamper body.

2. The laundry cart of claim 1 wherein said base assembly includes a perforated plate forming a top surface of said base.

3. The laundry cart of claim 1 wherein said corner plates are formed of polymeric material having a peripheral edge extending outward beyond the edges of said laundry cart to act as a bumper.

4. The laundry cart of claim 1 wherein said corner plates are formed of metal having polymeric material covering, said covering having a peripheral edge extending outward beyond the edges of said laundry cart to act as a bumper.

5. The laundry cart of claim 1 including at least one central upright positioned between said corner uprights along the length of said laundry cart, said at least one central upright extending between said base assembly and said respective crossmember.

6. The laundry cart of claim 1 including at least one offset upright positioned between said corner uprights along the width of said laundry cart, said at least one offset upright extending between said base assembly and said respective crossmember.

7. The laundry cart of claim 1 wherein said hamper body trim includes padding to prevent said respective crossmember from contacting a wall surface.

8. The laundry cart of claim 7 wherein said hamper body trim padding includes a rubber coating.

9. The laundry cart of claim 1 wherein a back side of said laundry cart is provided with a handle.

10. The laundry cart of claim 9 wherein said handle is removable and replaceable.

11. A laundry cart kit comprising:
- a base assembly having a quadrilateral shape, a U-shaped member extending along each of the longer sides of the quadrilateral shape, a portion of said U-shaped member being rotated to a shipping position, whereby an upright portion of said U-shaped member extends in the same plane as said base assembly, said upright portion rotatable to a use position for assembly of said laundry cart, whereby said U-shaped member extends upright with respect to said plane of said base assembly;
- a plurality of caster wheels for securement to a bottom surface of said base assembly;
- a frame assembly including a plurality of corner uprights constructed and arranged to attach to said U-shaped members of said base, so that at least one corner upright is positioned at each corner of said laundry cart;
- a corner plate securable at a top portion of each said corner upright, said corner plates are formed of polymeric material having a peripheral edge extending outward beyond the edges of said laundry cart to act as a bumper;
- a plurality of crossmembers extending horizontally between said corner plates to construct an open centered quadrilateral; and
- a hamper body sized and configured to sit within said frame assembly having a bottom surface of said hamper body resting on a top surface of said base assembly, a reinforced trim extending around a top periphery opening of said hamper body, said reinforced trim constructed and arranged to allow said crossmembers to pass therethrough to support said top periphery of said hamper body.

12. The laundry cart kit of claim 11 including a handle member, said handle member securable to said corner uprights at a rear portion of said laundry cart.

13. The laundry cart kit of claim 11 wherein said corner plates are formed of metal having polymeric material covering, said covering having a peripheral edge extending outward beyond the edges of said laundry cart to act as a bumper.

14. The laundry cart kit of claim 11 wherein said hamper body trim includes padding to prevent said respective crossmember from contacting a wall surface.

* * * * *